H. W. LEY.
AIR BRAKE SYSTEM.
APPLICATION FILED AUG. 27, 1908.

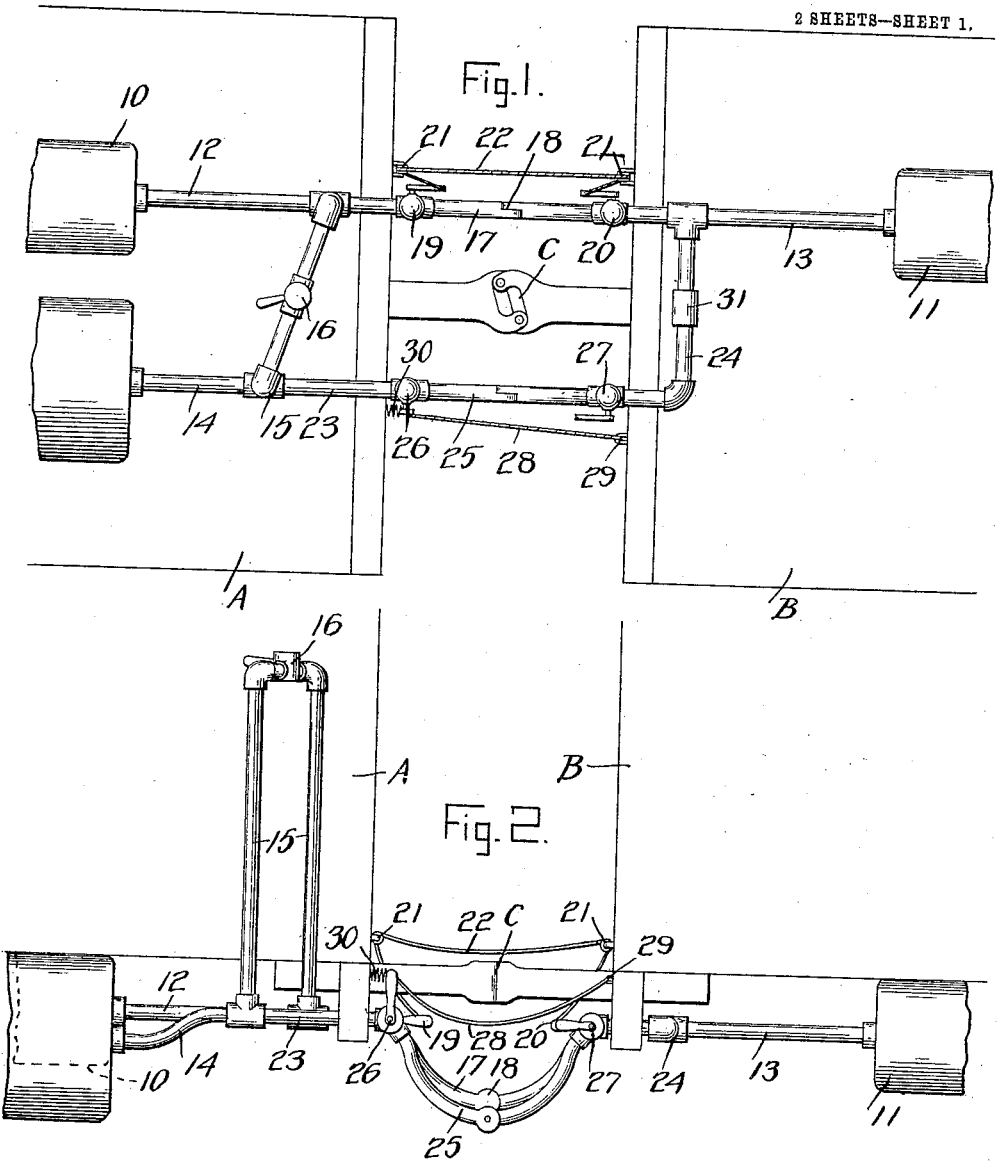

909,809.

Patented Jan. 12, 1909.

2 SHEETS—SHEET 2.

Witnesses
E. K. Reichenbach
M. I. Miller

Inventor
Herman W. Ley

By Chandler & Chandler
Attorneys

UNITED STATES PATENT OFFICE.

HERMAN W. LEY, OF BOULDER, COLORADO, ASSIGNOR OF ONE-FOURTH TO JESSE T. STENNER, OF MARE ISLAND, CALIFORNIA.

AIR-BRAKE SYSTEM.

No. 909,809.　　　　Specification of Letters Patent.　　　Patented Jan. 12, 1909.

Application filed August 27, 1908. Serial No. 450,496.

*To all whom it may concern:*

Be it known that I, HERMAN W. LEY, a citizen of the United States, residing at Boulder, in the county of Boulder, State of Colorado, have invented certain new and useful Improvements in Air-Brake Systems; and I do hereby declare the following to be a full, clear, and exact description of the invention, such as will enable others skilled in the art to which it appertains to make and use the same.

This invention relates to air brake systems and more particularly to an automatic air brake system.

Owing to the numerous accidents and consequent damage suits, the use of trailers on street railways, has been discontinued in many cities and where they are still employed, extra brakemen are frequently employed upon the trailers to stop the trailers if they should break away from the motor cars going up grade. It is however desirable and economical for the railway companies to run trailers and in order that this may be done with perfect safety and without the necessity of providing for extra brakemen, I have devised an air brake system so constructed and arranged that should the trailer of the train break away from the motor car while the train is going up grade, the brakes upon the trailer will be automatically applied.

One of the novel features of the invention and one which renders it extremely desirable for use resides in the fact that it is constructed so as to operate with any of the ordinary brake systems now employed on street railways without in any way interfering with the ordinary manual actuation of the system.

A further feature of the invention resides in the fact that while the brakes are automatically applied upon the trailer or trailers should the trailer or trailers break away from the motor car, the brakes upon the motor car are left entirely under the control of the motorman or brakeman and damage to the driving gear and the motors of the motor cars is in this manner obviated as the motor car may be brought gradually to a stand still. It of course does not matter if the brakes upon the trailer are suddenly applied as the trailer very quickly loses its forward or upward momentum and then has a tendency toward backward movement so that the brakes in reality merely arrest this backward movement and are applied practically at the same time the trailer stops of its own accord before starting backwards down grade.

Figure 3:
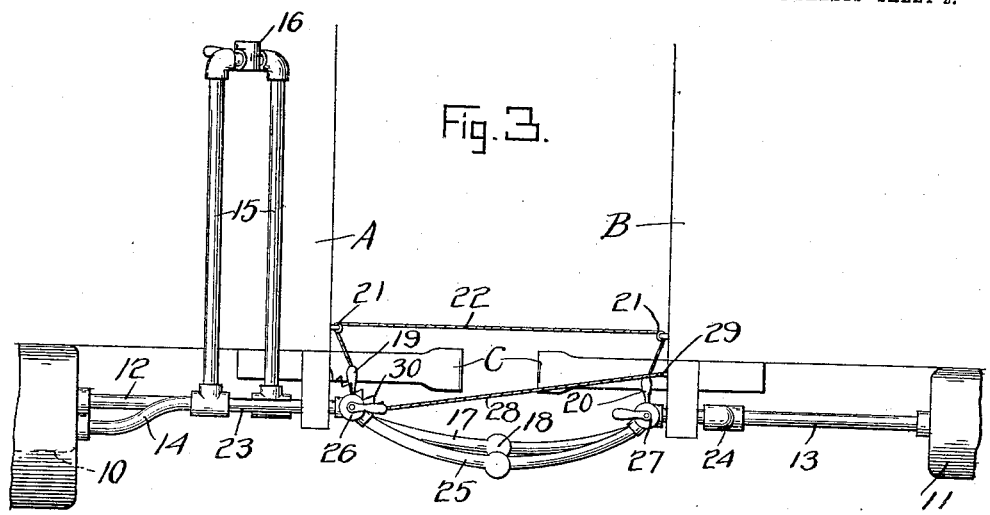
Figure 4:
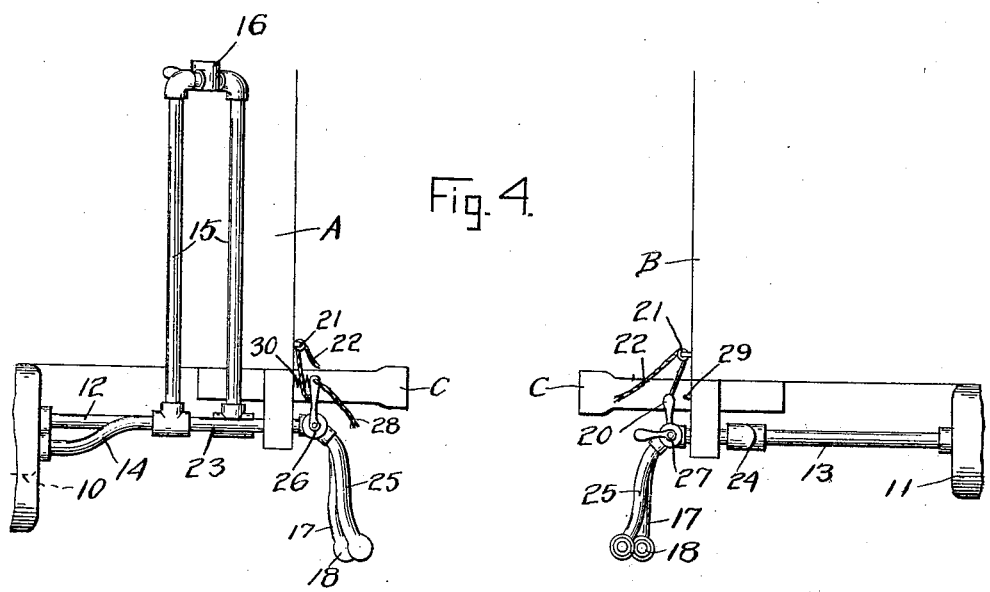

In the accompanying drawings, Figure 1 is a plan view of the air brake system embodied in my invention, Fig. 2 is a side elevation thereof showing the parts in normal position, Fig. 3 is a similar view but showing the initial actuation of the system, and, Fig. 4 is a view similar to Fig. 2 but showing the system as finally actuated to apply the brakes.

In the drawings, the motor car is indicated in general by the reference character A and the trailer by the reference character B the two cars being coupled by the usual form of coupling C. The brake cylinder upon the motor car is indicated by the numeral 10 and the brake cylinder upon the trailer by the numeral 11 the train pipe upon the motor car being indicated by the numeral 12 and the one upon the trailer by the numeral 13 they being led to the respective brake cylinders 10 and 11.

The reservoir pipe is of course carried by the motor car A and this pipe is indicated by the numeral 14 and includes the usual vertical extension 15 which leads to the engineer valve 16 as does also the train pipe 12 it being understood of course that this valve is to be manipulated as is the ordinary manner to admit air under pressure from the reservoir pipe 14 to the train pipe 12 and the brake cylinder 10 and also by way of the usual coupling hose 17, which hose connects the two train pipes 12 and 13 between the cars, to the said pipes 13 and the respective brake cylinder 11. The usual form of coupling 18 is provided for the meeting ends of the two sections of coupling hose and the usual angle cocks 19 and 20 are interposed in the train plates 12 and 13 respectively they being normally opened. The system as described so far is that ordinarily employed upon street railway cars and it is in connection with this form of air brake system that the device embodied in my invention is to be used and I will now describe that portion of the system to which my invention relates.

Mounted upon each of the cars A and B is a pulley 21 and passed over these pulleys and connected at its ends with the handles of the angle cocks 19 and 20 is a cable or other flexible connection 22. The function of this construction will be presently described in connection with the description of the operation of the system.

A branch 23 leads from the reservoir pipe 14 and a branch 24 leads from the train pipe 13 and connecting these two branches 23 and 24 is a hose connection 25 which is identical in construction with the connection 17 heretofore mentioned and which of course establishes communication between the reservoir pipe and the train pipe 13 under conditions which will be presently explained. A valve 26 is interposed in the branch 23 and an angle cock 27 is interposed in the branch 24 the angle cock 27 being normally left open. A cable or other flexible connection 28 is connected at one end to the handle of the valve 26 and at its other end is secured as at 29 to some convenient point upon the trailer B and a spring 30 is also connected with the handle of the valve 26 and with the motor car A the tendency of the spring being normally to hold the valve in closed position. For a purpose which will be presently explained, a check valve 31 is interposed in the branch 24 of the train pipe 13 upon the trailer.

The operation of the system will now be fully described, but prior to this description it will be well to state that the connection 22 has less slack than the connection 28 and the hose connection 17 has less slack than the hose connection 25. It will be supposed that the coupling C breaks or becomes uncoupled in some manner due to accident or to defective parts and that the trailer B leaves the motor car A. The initial movement of the trailer in this direction will act to pull upon the connection 22 and such pull upon the connection will result in the handles of the angle cocks 19 and 20 being simultaneously swung to closed position so that when the hose coupling 17 becomes severed due to strain placed upon it, as will be presently described, air cannot escape by way of the train pipe or in other words through the angle cocks 19 and 20. Prior to the separation of the hose coupling 17, the connections 28 will be placed at a tension and the valve 26 will be opened thereby allowing a sudden rush of air under pressure from the reservoir pipe 23 by way of the hose couplings 25 to the branch 24 of the train pipe 13 and through the train pipe 13 to the brake cylinder 11 upon the trailer B.

The air under pressure rushing through the branch 24 into the train pipe 13 upon the trailer will of course pass the valve 31 but this valve will prevent any back rush of air as will be readily understood. Finally, the hose connections 17 and 25 will become severed due to the strain eventually put upon them and as the connection 28 has already been severed, the spring 30 will pull the valve 26 back to closed position thus preventing further escape of air from the reservoir pipes 14 to the atmosphere. It will thus be seen that while sufficient air is let into the train pipe 13 of the trailer to firmly and positively apply the brakes and stop the trailer automatically, the air pressure is still maintained in the reservoir pipe 14 and is at the control of the engineer by the manipulation of the valve 16 which controls the admission of the air from this reservoir pipe into the train pipe 12 of the motor car the engineer or motorman being in this manner permitted to bring the motor car to a standstill at whatever time he deems it most advisable.

What is claimed is:

1. In an air brake system for coupled cars, in combination, a reservoir pipe carried by one car, a train pipe carried by the other car, and means arranged upon abnormal tendency toward separation of the cars to automatically admit air under pressure from the reservoir pipe into the train pipe.

2. In an air brake system for coupled cars, in combination, a reservoir pipe carried by one car, a train pipe carried by the other car, and connection between said pipes arranged upon abnormal tendency toward separation of the cars to automatically admit air under pressure from the reservoir pipe into the train pipe.

3. In an air brake system for coupled cars, in combination, a reservoir pipe carried by one car, a train pipe carried by the other car, and a connection between said pipes arranged for actuation by abnormal tendency toward separation of the cars to automatically admit air under pressure from the reservoir pipe into the train pipe.

4. In an air brake system for coupled cars, in combination, a reservoir pipe carried by one car, a train pipe carried by the other car, and means actuated through abnormal tendency toward separation of the cars to automatically admit air under pressure from the reservoir pipe to the train pipe.

5. In an air brake system for coupled cars, in combination, a reservoir pipe carried by one car, a train pipe carried by the other car, a pipe connection between said pipes, and a valve interposed in said pipe connection and arranged for actuation upon abnormal tendency toward separation of the cars to automatically admit air under pressure from the reservoir pipe into the train pipe.

6. In an air brake system for coupled cars, in combination, a reservoir pipe carried by one car, a train pipe carried by the other car, a pipe connection between said pipes, a valve interposed in the said pipe connection, and means connected with the valve and arranged upon abnormal tendency toward separation of the cars to automatically open said valve and admit air under pressure from the reservoir pipe into the train pipe.

7. In an air brake system for coupled cars, in combination, a reservoir pipe carried by one car, a train pipe carried by the other car, a pipe connection between the two pipes, a valve interposed in said pipe connection, means arranged for actuation upon abnormal tendency toward separation of the cars to automatically open said valve and admit air under pressure from the reservoir pipe into the train pipe, and means for automatically closing said valve after it has been opened.

8. In an air brake system for coupled cars, in combination, a reservoir pipe carried by one car, a train pipe carried by the other car, and a connection between said pipes arranged for actuation through abnormal tendency toward separation of the cars to automatically admit air under pressure from the reservoir to the train pipe.

9. In an air brake system for coupled cars, in combination, a reservoir pipe carried by one car, a train pipe carried by the other car, and connection between said pipes arranged upon abnormal tendency toward separation of the cars to automatically admit air under pressure from the reservoir pipe to the train pipe, said connection being constructed and arranged to automatically close the outlet from the reservoir pipe after actuation to admit air into the train pipe.

10. In an air brake system for coupled cars, in combination with a reservoir pipe carried by one car, and coupled train pipes carried one by each car, of a normally closed bypass connection between the reservoir pipe and the train pipe of the other car, and means for automatically opening said by pass connection upon tendency toward abnormal separation of the cars to admit air under pressure from the reservoir pipe to the said train pipe.

11. In an air brake system for coupled cars, in combination with a reservoir pipe carried by one car, and coupled train pipes carried one by each car, of a by pass connection between the reservoir pipe and the train pipe of the other car, a valve interposed in said connection, and means for automatically opening said valve upon tendency toward abnormal separation of the cars to admit air under pressure from the reservoir pipe into the said train pipe.

12. In an air brake system for coupled cars, the combination with a reservoir pipe carried by one car, and coupled train pipes carried one by each car, of a normally closed by pass connection between the reservoir pipe and the train pipe of the other car, and means arranged for actuation automatically through tendency toward abnormal separation of the cars to open said valve and admit air under pressure from the reservoir pipe to the train pipe.

13. In an air brake system for coupled cars, the combination with a reservoir pipe carried by one car, and coupled train pipes carried one by each car, of a normally closed by-pass connection between the reservoir pipe and the train pipe of the other car, means for automatically opening said by-pass connection upon tendency toward abnormal separation of the cars to admit air under pressure from the reservoir pipe to the said train pipe, and means for automatically reclosing said connection.

14. In an air brake system for coupled cars, the combination with a reservoir pipe carried by one car, and coupled train pipes carried one by each car, of a by-pass connection between the reservoir pipe and the train pipe of the other car, a valve interposed in said connection, means for automatically opening said valve through tendency toward abnormal separation of the car to admit air under pressure from the reservoir pipe to the said train pipe, and means for returning said valve to closed position.

15. In an air brake system for coupled cars, the combination with a reservoir pipe carried by one car, and coupled pipes carried one by each car, of a normally closed by-pass connection between the reservoir pipe and the train pipe of the other car, means for automatically opening said by-pass connection upon tendency toward abnormal separation of the cars to admit air under pressure from the reservoir pipe to the said train pipe, and means interposed in the said by-pass connection at a point adjacent the connection with the train pipe to automatically close the said connection after the admission of air to the train pipe.

16. In an air brake system for coupled cars, the combination with a reservoir pipe carried by one car, and coupled train pipes carried one by each car, of a normally closed by-pass connection between the reservoir pipe and the train pipe of the other car, means for automatically opening the by-pass connection upon tendency toward abnormal separation of the cars to admit air under pressure from the reservoir pipe to the said train pipe, means for automatically reclosing said by-pass connection after the admission of air to the said train pipe, and means interposed in the said connection adjacent the connection of the same with the train pipe for preventing escape of the admitted air.

17. In an air brake system for coupled cars, the combination with a reservoir pipe, carried by one car, and coupled train pipes carried one by each car, of a by-pass connection between the reservoir pipe and the train pipe of the other car, a valve interposed in the said by pass connection, connection between the valve and one of the cars for opening the valve upon tendency toward abnormal separation of the cars to admit air under pressure from reservoir pipe to the said train pipe, means connected with the valve for automatically reclosing it after the admission of air, and means interposed in the said by-pass connection for automatically reclosing the same and preventing the escape of the admitted air.

18. In an air brake system for coupled cars, the combination with a reservoir pipe carried by one car, and coupled train pipes carried one by each car, of a by-pass connection between the reservoir pipe and the train pipe of the other car, said by-pass connection being arranged to admit air under pressure from the reservoir pipe into the said train pipe of the other car and being controlled for such admission by tendency toward abnormal separation of the cars.

19. In an air brake system for coupled cars, the combination with the train pipes of the cars and the angle cocks and connections, the reservoir pipe upon one car, and means for automatically closing the angle cock upon separation of the cars, of means acting upon said separation of the cars to admit air under pressure from the reservoir pipe upon one car to the train pipe of the other car.

20. In an air brake system, in combination with a train pipe for coupled cars, and the angle cock and connections, and the reservoir pipe upon one car, of means for automatically closing the angle cock upon separation of the cars, and means acting subsequently to admit air under pressure from the reservoir pipe upon one car to the train pipe of the other car.

21. In an air brake system, in combination with train pipes of coupled cars, and the angle cock and connections, and the reservoir pipe upon one car, of means for automatically closing the angle cock upon separation of the car and a connection between the reservoir pipe upon one car and the train pipe of the other car constructed and arranged to be opened upon separation of the cars to admit air under pressure from the reservoir pipe to the said train pipe.

22. In an air brake system for coupled cars, the combination with coupled train pipes and their angle cocks and their reservoir pipe upon one car, of a connection between the angle cocks of the two cars constructed and arranged to close the said cocks upon separation of the cars, and a by-pass connection between the reservoir pipe and the train pipe of the other car constructed to be opened immediately subsequent to the closing of the angle cock to admit air under pressure from the reservoir pipe to the said train pipe.

23. In an air brake system for coupled cars, the combination with a reservoir pipe carried by one car, coupled train pipes carried by the cars, and angle cocks interposed in the train pipes, of a connection between the angle cock arranged to close the said cocks upon separation of the cars, a by-pass connection between the reservoir pipe and the train pipe of the other car, a valve interposed in said connection, connection between the valve and one of the cars for opening said valve upon separation of the cars, the connection being constructed and arranged to actuate the valve subsequent to the closing of the angle cock, and means for automatically returning the valve to closed position.

24. In an air brake system for coupled cars, the combination with a reservoir pipe carried by one car, and coupled train pipes carried one by each car, and angle cock interposed in the train pipe, of a flexible connection between the angle cocks arranged to close the said cock upon separation of the cars, a by-pass connection between the reservoir pipe and the train pipe of the other car, a valve interposed in said connection, said valve being normally closed, and a connection between the valve and one of the cars for moving the same to open position upon separation of the cars, the last mentioned connection being arranged to actuate the last mentioned valve subsequent to the actuation of the angle cocks by the first mentioned connection.

In testimony whereof, I affix my signature, in presence of two witnesses.

HERMAN W. LEY.

Witnesses:
 GEO. H. HALE,
 HALL C. HANCOCK.